May 5, 1931.  F. E. HUMMEL  1,803,617
CAR LINER
Filed June 19, 1930   2 Sheets-Sheet 2
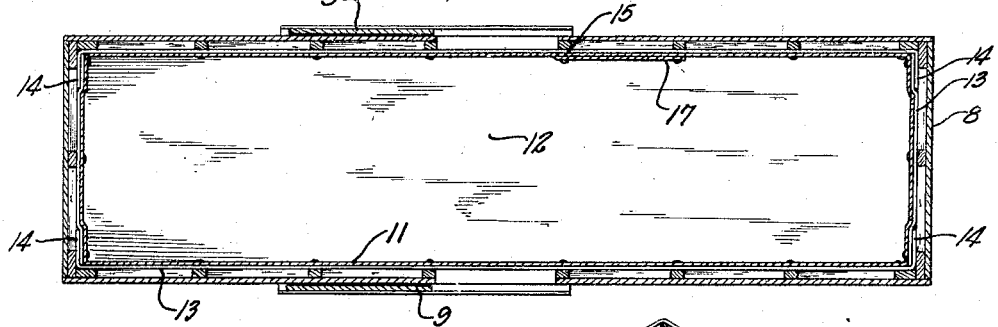
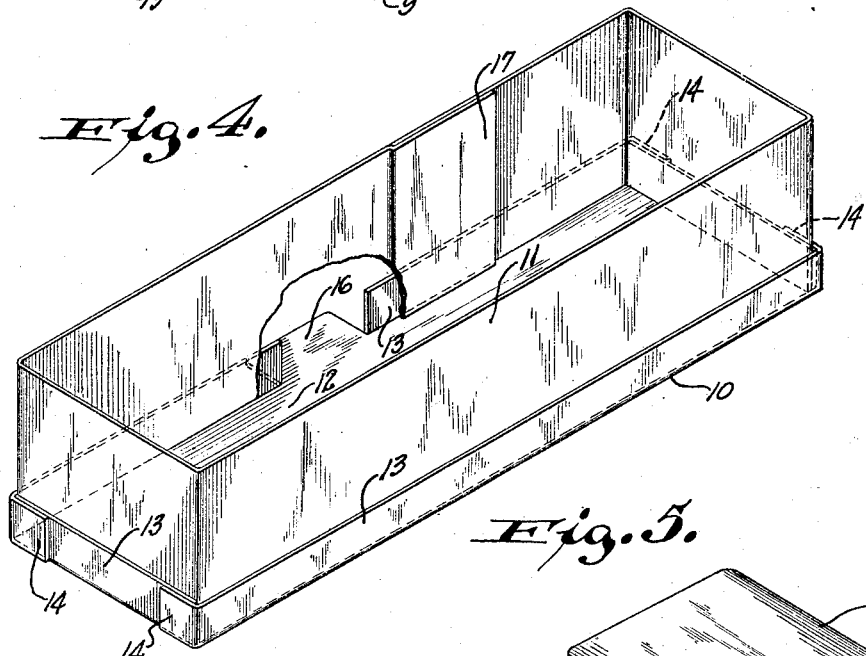
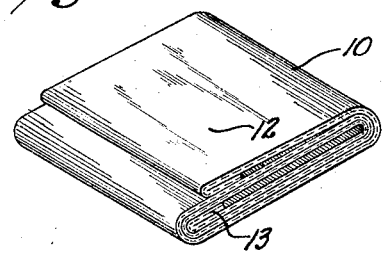
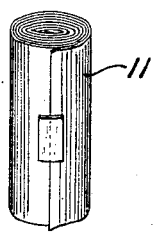
INVENTOR.
Frederick E. Hummel,
BY
Morsell, Keeney + Morsell
ATTORNEYS Patented May 5, 1931

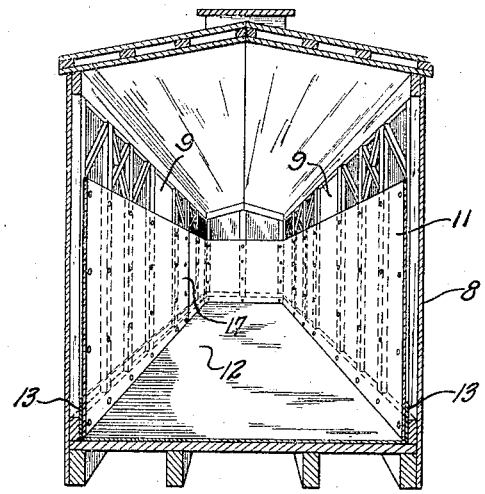
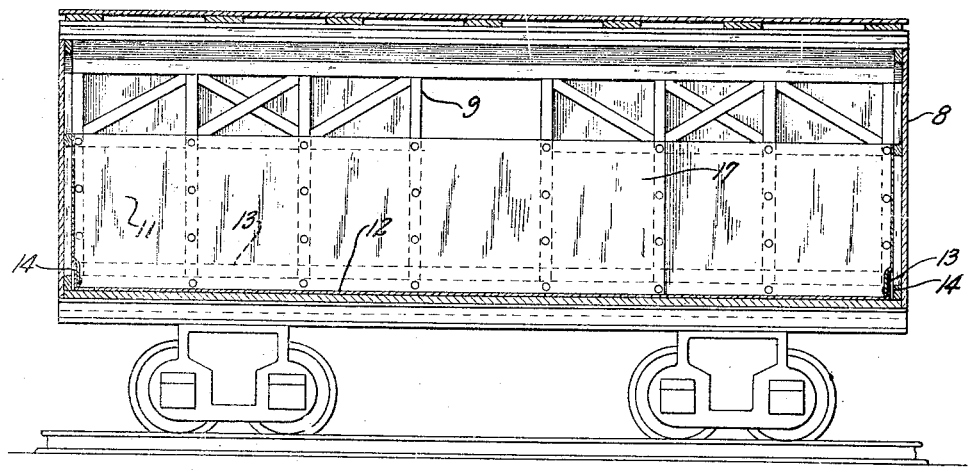

1,803,617

UNITED STATES PATENT OFFICE

FREDERICK E. HUMMEL, OF HOPEWELL, VIRGINIA

CAR LINER

Application filed June 19, 1930. Serial No. 462,264.

This invention relates to improvements in car liners, and more particularly to liners for box cars which are loaded with bulk granular and crushed material such as grain, feed stuff, sugar, lime, cement, nitrates, sand, crushed slate, and the like.

It is one of the objects of the present invention to provide a car liner including a bottom portion and side portions so arranged and constructed that in effect a seal is formed between the bottom of the liner and the sides thereof, whereby material cannot leak out onto the wooden floor of the car and rearwardly of the inside portions of the car, and the arrangement being such that the more material within the liner, the tighter the seal will be.

A further object of the invention is to provide a car liner which may be applied to and tightly secured within the interior of a car in a very simple and expeditious manner.

A further object of the invention is to provide a car liner in which the bottom member may be folded into a relatively small, compact bundle, and the side portion may be formed in a roll whereby the car liner, when not in use, will occupy a minimum amount of space for storage or transportation.

A further object of the invention is to provide a car liner which is in bundle form prior to application, each bundle being so arranged that when it is placed in the center of a car it will unfold outwardly in both directions, said car liner being of such a character that it will require the services of but one man to apply the same.

A further object of the invention is to provide a car liner which is reinforced at its corner portions.

A further object of the invention is to provide a car liner which is of very simple construction, is strong and durable, is inexpensive to manufacture and apply, and is well adapted for the purposes described.

With the above and other objects in view, the invention consists of the improved car liner and its parts and combinations as set forth in the claims, and all equivalents thereof.

In the accompanying drawings in which the same reference characters indicate the same parts in all of the views:

Fig. 1 is a transverse sectional view of the body of a box car showing the improved car liner applied to the interior thereof;

Fig. 2 is a longitudinal vertical sectional view of a box car and car liner therein;

Fig. 3 is a longitudinal horizontal sectional view thereof;

Fig. 4 is a perspective view of the improved car liner in its "set-up" or installed condition, with a portion broken away to show a detail of construction;

Fig. 5 is a perspective view of the bottom member of the car liner as folded into a compact package; and Fig. 6 is a perspective view of the side portion of the car liner in roll form for storage and prior to being applied to a car's side walls.

Referring now more particularly to the drawings it will appear that the numeral 8 indicates a freight car of any conventional or desirable type having the usual opposed sliding side doors 9. The improved car liner, adapted for application to the interior of a car 8, comprises two distinct members, a bottom member 10, and a siding member 11, formed of heavy paper, cardboard, or other similar, suitable fibrous material.

The bottom member 10 consists of an elongated flat bottom portion 12 of a length and width so as to completely cover the bottom of the car 8, and the edge portions of said bottom are formed with a relatively low upstanding continuous flange 13. There are lines of severance between the extremities of the side and end portions of the flange, forming end tabs 14 which are folded over on the end flange portions to insure tight joints at the ends.

Prior to the installation of the bottom member in a car the portions of the flange 13 are folded flatly onto the bottom portion 12 and the entire bottom member is folded into a compact bundle, as shown in Fig. 5. When the liner is to be applied to the interior of a car the folded bottom member is inserted into the car through one of the side doors 9 thereof, and then the bottom member is unfolded in both directions toward the ends of the car until the entire car bottom is covered thereby. The flange portions 13 are then folded upwardly, and said flange portions are tacked or otherwise secured at spaced intervals to side wall portions of the car.

The siding member 11 of the car liner is initially in a convenient roll form, as shown in Fig. 6, and after the bottom member has been secured in place as before described, said siding roll is taken into the car, and its outer end portion is tacked or secured within the car adjacent a side of one of its doors, as at 15 in Fig. 3. Then, said siding is unrolled and run around and against the inner surfaces of the car walls, being positioned inwardly of the flange 13 and with its lower edge resting on the bottom portion 12, and being secured to the inner side walls of the car at suitable spaced points. The siding is secured, without severance from the remaining portion of the roll, on the opposite side of the door from which it was commenced, so as to leave said door opening unobstructed for loading purposes. Also, for convenience in loading a portion of the flange 13 adjacent said door, and the width thereof is torn or severed from the adjacent flange portions, and is folded outwardly downwardly, as indicated at 16 in Fig. 4.

After the car has been loaded the portion 16 of the flange 13 is pushed into upright position and is so secured and then the siding 11 is drawn from its point of attachment at one side of the door opening across said door opening and is overlapped on the inner portion of the siding a short distance, and is so secured, as at 17. In the majority of cases where the car is loaded with bulk material, it is loaded high at each end of the car and relatively low toward the mid portion of the car. Hence, the material may be pushed or shoveled away from the originally open door, which will permit the siding to be conveniently drawn across the door opening, overlapped, and secured. The workmen may escape from the car over the siding at the open door, the height of the siding being less than the height of the door opening, as shown in Figs. 1 and 2. After securement of the siding and escape of the workmen, the car door is closed.

It will therefore be seen that when the improved car liner is installed the bottom portion of a car is completely covered thereby as well as the inner side portions thereof for a substantial height. The siding has its lower edge portions within the flange 13 and against the same and the bottom portion of a liner, whereby a tightly sealed joint is formed between the liner bottom and siding, preventing leakage of granular material onto the car floor or bottom. Furthermore, when a quantity of material is loaded into the lined car the pressure thereof against the siding will hold it tightly against the flange 13 making the joint more effective. From the foregoing description it will also be evident that the improved car liner is easily installed, is strong and durable, and is well adapted for the purpose set forth.

What I claim as my invention is:

1. A car liner, comprising a one-piece bottom member having at its side and end edges upstanding flanges, and a one-piece, continuous siding member positioned on said bottom and against the inner faces of said flanges, said siding extending upwardly from the bottom member and extending around the entire periphery thereof.

2. A car liner, comprising a one-piece bottom member formed of foldable fibrous material and having at its side and end edges upstanding flanges, and a one-piece, continuous siding member formed of fibrous material and positioned edgewise adjacent said bottom and in overlapping engagement with the inner faces of said flanges and secured thereto, said siding extending upwardly from the bottom member and extending around the entire periphery thereof.

3. A car liner, comprising a one-piece bottom member formed of foldable fibrous material and having at its side and end edges upstanding flanges, and a one-piece, continuous siding member formed of fibrous material and positioned edgewise adjacent said bottom and in overlapping engagement with the inner faces of said flanges and secured thereto, said siding extending upwardly from the bottom member and extending around the entire periphery thereof, the opposite end portions of said siding being secured together in overlapping engagement.

4. A car liner, comprising a one-piece bottom member formed of foldable fibrous material and having at its side and end edges upstanding flanges, the end portions of the side flanges being folded and overlapped against the end portions of the end flanges, and a one-piece, continuous siding member formed of fibrous material and positioned edgewise adjacent said bottom and in overlapping engagement with the inner faces of said flanges and secured thereto, said siding extending upwardly from the bottom member and extending around the entire periphery thereof, the opposite end portions of said siding being secured together in overlapping engagement.

5. The method of lining a side door box car, which consists in forming a fibrous material bottom member of dimensions corresponding to the bottom of the car and forming upwardly foldable side and end flanges on said bottom member, folding said member into a compact bundle and then introducing the bundle into the car through said open side door, unfolding said bundle so as to completely cover the car bottom thereby and folding said flanges upwardly and outwardly against inner surfaces of the sides and ends of the car and securing said flanges to said car portions, then introducing into the car through said open side door a roll of fibrous material, securing the outer end of the material of said roll to an inner side wall of the car adjacent said open door and unrolling said material and securing it about the entire inner periphery of the car up to the opposite side of said open door, said roll material having its lower edge portion overlapping and in engagement with the inner surfaces of said flanges and covering end and side portions of the car for substantial heights, and finally, after the car has been filled, continuing said roll material across said door opening and overlapping for a substantial distance the original end portion of the roll material and securing said overlapping portion thereto.

In testimony whereof I affix my signature.

FREDERICK E. HUMMEL.